US006704317B1

United States Patent
Dobson

(10) Patent No.: US 6,704,317 B1
(45) Date of Patent: *Mar. 9, 2004

(54) MULTI-CARRIER LAN MODEM SERVER

(75) Inventor: William Kurt Dobson, Sandy, UT (US)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,907

(22) Filed: May 27, 1998

(51) Int. Cl.$^7$ .............................................. H04L 12/28
(52) U.S. Cl. ..................................... 370/401; 375/260
(58) Field of Search ................................ 370/337, 328, 370/338, 400, 401–402, 403, 404, 405, 406, 407, 420, 421, 425, 352, 354, 356, 493, 494, 495, 497; 375/260, 354, 229, 232, 285, 296

(56) References Cited

U.S. PATENT DOCUMENTS

| | | | |
|---|---|---|---|
| 3,679,882 A | 7/1972 | McAuliffe | 235/152 |
| 4,106,103 A | 8/1978 | Perreault | 364/827 |
| 4,152,649 A | 5/1979 | Choquet | 325/42 |
| 4,227,152 A | 10/1980 | Godard et al. | 375/13 |
| 4,233,589 A | 11/1980 | Rawson et al. | 340/147 |
| 4,247,908 A | 1/1981 | Lockhart, Jr. et al. | 364/900 |
| 4,345,250 A | 8/1982 | Jacobsthal | 340/825.5 |

(List continued on next page.)

FOREIGN PATENT DOCUMENTS

| | | |
|---|---|---|
| EP | 0 795 977 A2 | 9/1997 |
| EP | 0 795 984 A2 | 9/1997 |
| WO | WO 96/24207 | 8/1996 |

OTHER PUBLICATIONS

Antipolis, Sophia, *A Conceptual Study of OFDM–Based Multiple Access Schemes, Part 4: Tracking of Time and Frequency Offset*, Telia Research, Dec. 1996, pp. 1–12.

Edfors, O., Sandell, M., Van De Beek, J., Landstrom, D., Sjoberg, F., *An Introduction to Orthogonal Frequency–Division Multiplexing*, Sep. 1996, pp. 1–58.

Edfors, O., Sandell, M., Van De Beek, J., Wilson, S., Borjesson, P., OFDM *Channel Estimation by Singular Value Decomposition*, Division of Signal Processing, Lulea University of Technology, Lulea, Sweden, Purdue University, School of Electrical and Computer Engineering, West Lafayette, Indiana, pp. 1–5.

(List continued on next page.)

*Primary Examiner*—Steven Nguyen
*Assistant Examiner*—Phoungchau Ba Nguyen
(74) *Attorney, Agent, or Firm*—McDonnell Boehnen Hulbert & Berghoff

(57) ABSTRACT

A gateway modem server device for a home LAN. The modem server includes a first transceiver that utilizes DMT modulation methods for communication over the local LAN, and a second transceiver for communication with the access infrastructure that utilizes POTS telephone services. The LAN devices connected to the LAN access the modem server via LAN adapter devices. The adapter devices are internal or external to the LAN devices and provide a transceiver and protocol stacks for the LAN devices to communicate with each other. The physical layer of the transceivers includes transmitter having a DMT modulator and demodulator that is dynamically configurable with respect to data rate and spectrum usage. The devices communicate with the modem server and the modem server communicates to the POTS service provider over the same medium.

20 Claims, 6 Drawing Sheets

U.S. PATENT DOCUMENTS

| | | | |
|---|---|---|---|
| 4,430,743 A | 2/1984 | Watanabe | 333/18 |
| 4,509,206 A | 4/1985 | Carpe et al. | 455/245 |
| 4,519,074 A | 5/1985 | Basile | 370/124 |
| 4,539,689 A | 9/1985 | Chiu et al. | 375/13 |
| 4,652,874 A | 3/1987 | Loyer | 340/825.05 |
| 4,745,600 A | 5/1988 | Herman et al. | 370/95 |
| 4,751,701 A | 6/1988 | Roos et al. | 370/85 |
| 4,760,375 A | 7/1988 | Stecker | 340/310 |
| 4,881,222 A | 11/1989 | Goeckler et al. | 370/70 |
| 4,885,742 A | 12/1989 | Yano | 370/85.2 |
| 4,885,743 A | 12/1989 | Helbers et al. | 370/85.2 |
| 4,899,217 A | 2/1990 | MacFadyen et al. | 358/86 |
| 4,901,342 A | 2/1990 | Jones | 379/93 |
| 4,943,980 A | 7/1990 | Dobson et al. | 375/42 |
| 4,959,713 A | 9/1990 | Morotomi et al. | 358/108 |
| 4,965,792 A | 10/1990 | Yano | 370/85.2 |
| 5,003,579 A | 3/1991 | Jones | 379/93 |
| 5,051,720 A | 9/1991 | Kittirutsunetorn | 340/310 |
| 5,117,418 A | 5/1992 | Chaffee et al. | 370/32.1 |
| 5,121,414 A | 6/1992 | Levine et al. | 375/96 |
| 5,128,964 A | 7/1992 | Mallory | 375/39 |
| 5,130,793 A | 7/1992 | Bordry et al. | 358/86 |
| 5,166,924 A | 11/1992 | Moose | 370/32.1 |
| 5,195,106 A | 3/1993 | Kazecki et al. | 375/12 |
| 5,197,066 A | 3/1993 | Sutterlin | 370/85.3 |
| 5,206,886 A | 4/1993 | Bingham | 375/97 |
| 5,210,530 A | 5/1993 | Kammerer et al. | 340/825.08 |
| 5,226,081 A | 7/1993 | Hinokimoto | 380/34 |
| 5,228,062 A | 7/1993 | Bingham | 375/97 |
| 5,278,844 A | 1/1994 | Murphy et al. | 371/37.1 |
| 5,285,474 A | 2/1994 | Chow et al. | 375/13 |
| 5,313,169 A | 5/1994 | Fouche et al. | 329/302 |
| 5,317,596 A | 5/1994 | Ho et al. | 370/32.1 |
| 5,319,674 A | 6/1994 | Cherubini | 375/101 |
| 5,329,552 A | 7/1994 | De Couasnon et al. | 375/59 |
| 5,353,287 A | 10/1994 | Kuddes et al. | 370/85.2 |
| 5,355,375 A | 10/1994 | Christensen | 370/85.2 |
| 5,377,327 A | 12/1994 | Jain et al. | 395/200 |
| 5,400,322 A | 3/1995 | Hunt et al. | 370/19 |
| 5,410,292 A | 4/1995 | Le Van Suu | 340/310.06 |
| 5,461,640 A | 10/1995 | Gatherer | 375/231 |
| 5,479,447 A | 12/1995 | Chow et al. | 375/260 |
| 5,519,727 A | 5/1996 | Okanoue et al. | 375/232 |
| 5,519,731 A | 5/1996 | Cioffi | 375/260 |
| 5,521,908 A | 5/1996 | Younce et al. | 370/32.1 |
| 5,521,937 A | 5/1996 | Kondo et al. | 375/206 |
| 5,539,777 A | 7/1996 | Grube et al. | 375/316 |
| 5,553,008 A | 9/1996 | Huang et al. | 364/578 |
| 5,568,476 A | 10/1996 | Sherer et al. | 370/60 |
| 5,570,350 A | 10/1996 | Myer et al. | 370/18 |
| 5,572,511 A | 11/1996 | Ouyang et al. | 370/13 |
| 5,572,546 A | 11/1996 | Serfaty et al. | 375/221 |
| 5,592,482 A | 1/1997 | Abraham | 348/8 |
| 5,596,577 A | 1/1997 | Perreault et al. | 370/449 |
| 5,596,604 A | 1/1997 | Cioffi et al. | 345/260 |
| 5,598,401 A | 1/1997 | Blackwell et al. | 379/94 |
| 5,606,577 A | 2/1997 | Grube et al. | 375/295 |
| 5,608,725 A | 3/1997 | Grube et al. | 370/338 |
| 5,621,662 A | 4/1997 | Humphries et al. | 364/550 |
| 5,623,513 A * | 4/1997 | Chow et al. | 375/285 |
| 5,625,651 A | 4/1997 | Cioffi | 375/354 |
| 5,625,871 A | 4/1997 | Myer et al. | 455/33.1 |
| 5,627,828 A | 5/1997 | Lee | 370/445 |
| 5,627,863 A | 5/1997 | Aslanis et al. | 375/357 |
| 5,636,211 A | 6/1997 | Newlin et al. | 370/465 |
| 5,636,246 A | 6/1997 | Tzannes et al. | 375/260 |
| 5,651,009 A | 7/1997 | Perreault et al. | 370/447 |
| 5,655,140 A | 8/1997 | Haddock | 395/200.16 |
| 5,659,891 A | 8/1997 | Hays et al. | 455/103 |
| 5,668,802 A | 9/1997 | Chalmers et al. | 370/276 |
| 5,671,251 A | 9/1997 | Blackwell et al. | 375/222 |
| 5,673,290 A | 9/1997 | Cioffi | 375/260 |
| 5,694,395 A | 12/1997 | Myer et al. | 370/480 |
| 5,694,396 A | 12/1997 | Firouzbakht et al. | 370/480 |
| 5,729,570 A | 3/1998 | Magill | 375/206 |
| 5,909,463 A | 6/1999 | Johnson et al. | 375/220 |
| 6,005,893 A * | 12/1999 | Hyll | 375/260 |
| 6,006,271 A | 12/1999 | Grabiec et al. | |
| 6,009,122 A * | 12/1999 | Chow | 375/260 |
| 6,031,868 A * | 2/2000 | Robertson et al. | 375/260 |
| 6,047,025 A * | 4/2000 | Johnson et al. | 375/232 |
| 6,069,899 A | 5/2000 | Foley | 370/494 |
| 6,097,776 A * | 8/2000 | Mesiwala | 375/285 |
| 6,101,182 A | 8/2000 | Sistanizadeh et al. | 370/352 |
| 6,101,216 A | 8/2000 | Henderson et al. | 375/222 |
| 6,130,893 A | 10/2000 | Whittaker et al. | 370/420 |
| 6,134,283 A * | 10/2000 | Sands et al. | 370/337 |
| 6,154,465 A | 11/2000 | Pickett | 370/466 |
| 6,169,723 B1 * | 1/2001 | Fertner et al. | 370/420 |
| 6,169,744 B1 | 1/2001 | Grabelsky et al. | |

OTHER PUBLICATIONS

Edfors, O., Sandell, M., Van De Beek, J., Wilson, S., Borjesson, P., *Analysis of DFT–Based Channel Estimators for OFDM*, Vehicular Technology Conference (VTC'96), Chicago, Illinois, Jul. 25–28, 1995, pp. 1–25.

Edfors, Ove, *Low–Complexity Algorithms in Digital Receivers*, Doctoral Thesis, Lulea University of Technology, Sep. 1996, pp. 1–190.

Isaksson, Mikael, *Proposal: Option for In–Band POT and ISDN*, Standards Project: TIE1.4:VDSL, Sep. 22–26, 1997, pp. 1–5.

Lulea University of Technology, Division of Signal Prosssing, *Synchronization in OFDM*, March 27, 1998, pp. 1–3.

Nilsson, R., Edfors, O., Sandell, M., Borjesson, P., *An Analysis of Two–Dimensional Pilot–Symbol Assisted Modulation for OFDM*, Division of Signal Processing, Luclea University of Technology, Sweden, Department of Applied Electronics, Lund University, Lund, Sweden, Lucent Technologies, Bell Labs, Windmill Hill Business Park, Swindon, UK, pp. 1–4.

Sandell, M., Edfors, O., *A Comparative Stud y of Pilot-–Based Channel Estimators for Wireless OFDM*, Sep. 1996, pp. 1–34.

Sandell, M., Van De Beek, J., Borjesson, P., *Timing and Frequency Synchronization in OFDM Systems Using the Cyclic Prefix*, Division of Signal Processing, Lulea University of Technology, Lulea, Sweden, pp. 1–4.

Sidhu, I., Grabelsky, D., *A Simple and Efficient Medium Access Layer Protocol for Local Area Networks with Multiple–Priority Traffic*, Advanced Technologies, Carrier Systems Division, 3Com, pp. 1–3.

Van De Beek, J., Edfors, O., Borjesson, P., Wahlqvist, M., Ostberg, C., *A Conceptual Study fo OFDM–Based Multiple Access Schemes, Part 2: Channel Estimation in the Uplink*, Lulea University of Technology, Lulea, Sweden, Telia Research, Lulea, Sweden, pp. 1–7.

Van De Beek, J., Edfors, O., Borjesson, P., Wahlqvist, M., Ostberg, C., *A Conceptual Study of OFDM–Based Multiple Access Schemes, Part 3: Performance Evaluation of a Coded System*, Lulea University of Technology, Lulea, Sweden, Telia Research, Lulea, Sweden, pp. 1–6.

Van De Beek, J., Edfors, O., Sandell, M., Wilson, S., Borjesson, P., *On Channel Estimation in OFDM Systems*, Division of Signal Processing, Lulea University of Technology, Sweden, Purdue University, School of Engineering, West Lafayette, Indiana, pp. 1–5.

Van De Beek, J., Sandell, M., Borjesson, P., *ML Estimation of Timing and Frequency Offset in Multicarrier Systems*, Division of Signal Processing, Lulea University of Technology, Lulea, Sweden, Apr., 1996, pp. 1–24.

Van De Beek, J., Sandell, M., Borjesson, P., *On Synchronization in OFDM Systems Using the Cyclic Prefix*, Division of Signal Processing, Lulea University of Technology, Lulea, Sweden, pp. 1–5.

Van De Beek, J., Sandell, M., Isaksson, M., Borjesson, P., *Low–Complex Frame Synchronization in OFDM Systems*, Division of Signal Processing, Lulea University of Technology, Lulea, Sweden, Telia Research, Lulea, Sweden, pp. 1–5.

Wahlqvist, M., Ostberg, C., Van De Beek, J., Edfors, O., Borjesson, P., *A Conceptual Study of OFDM–Based Multiple Access Schemes, Part 1:Air Interface Requirements*, Lulea University of Technology, Lulea, Sweden, Telia Research, Lulea, Sweden, pp. 1–7.

* cited by examiner-

MULTI-CARRIER LAN MODEM SERVER

BACKGROUND OF THE INVENTION

A. Field of the Invention

The present invention relates to Local Area Networks (LANs). More particularly, the invention relates to a LAN architecture specifically designed to be operated within a home environment, but may also be used in a small business setting. Home LANs may be used to connect computers, peripherals, TVs, and audio equipment, as well as less intelligent devices (appliances, thermostats, etc.), and provide connectivity to devices and networks outside the home (e.g., Internet and corporate LANs).

B. Description of the Related Art

Networks are collections of independent computers that communicate with one another over a shared physical connection, or network medium. Networks are often categorized as Local Area Networks (LAN) and Wide Area Networks (WAN).

1. Local Area Networks

Local area networks are usually confined to a specific geographic area, such as an office building. LANs, however, are not necessarily simple in design, and may link together hundreds of computers. The development of various standards for networking protocols has made possible the proliferation of LANs in organizations worldwide for business and educational applications.

Ethernet is a LAN networking protocol commonly utilized today. Ethernet typically utilizes a "star" or "spoke" topology, where each computer of the LAN is connected to other computers via a central hub. In such a configuration, each computer has its own private connection to the LAN and can be disconnected from the network without interfering with any other computer's connection.

Ethernet LAN technology was standardized by the Institute of Electrical and Electronics Engineers (IEEE) as the 802.3 specification entitled "Carrier Sense Multiple Access with Collision Detection (CSMA/CD) Access Method and Physical Layer Specifications." Initially, Ethernet technology used coaxial cable in a bus topology. However, it has evolved to take advantage of new technologies such as twisted pair cabling (10 Base-T), fiber optics (10 Base-FL), and 100 Mbps operation (100 Base-X, or Fast Ethernet). The current standard is known as IEEE 802.3u, the contents of which are hereby incorporated by reference. One limitation of 10/100Base-T is the requirement for "home run" cabling, i.e., each device is connected back to a central hub, as opposed to "daisy chain" connections.

The Ethernet system consists of three basic elements: the physical medium; medium access control rules; and a packet format. The physical medium is used to convey Ethernet signals from one computer to another. The medium access control rules are embedded in each Ethernet interface, and allow multiple computers to access the shared Ethernet channel. The Ethernet packet, or frame, consists of a standardized set of fields used to carry data over the system.

2. Wide Area Networks

Interconnected LAN networks or individual users located in multiple physical locations are known as Wide Area Networks (WAN). The interconnections are performed via services such as dedicated leased phone lines, digital subscriber lines, dial-up phone lines, satellite links, and data packet carrier services. Wide area networking can be as simple as providing modems and a remote access server to allow remote users to dial in; or it can be as complex as linking hundreds of branch offices across the world using special routing protocols. Once type of WAN interconnection mechanism is Asymmetric Digital Subscriber Line.

3. Asymmetric Digital Subscriber Lines

Asymmetric Digital Subscriber Line (ADSL) is a communication system that operates over existing twisted-pair telephone lines between a central office and a residential or business location. It is generally a point-to-point connection between two dedicated devices, as opposed to multi-point, where numerous devices share the same physical medium.

ADSL supports bit transmission rates of up to approximately 6 Mbps in the downstream direction (to a subscriber device at the home), but only 640 Kbps in the upstream direction (to the service provider/central office). ADSL connections actually have three separate information channels: two data channels and a POTS channel. The first data channel is a high-speed downstream channel used to convey information to the subscriber. Its data rate is adaptable and ranges from 1.5 to 6.1 Mbps. The second data channel is a medium speed duplex channel providing bi-directional communication between the subscriber and the service provider/central office. Its rate is also adaptable and the rates range from 16 to 640 kbps. The third information channel is a POTS (Plain Old Telephone Service) channel. The POTS channel is typically not processed directly by the ADSL modems—the POTS channel operates in the standard POTS frequency range and is processed by standard POTS devices after being split from the ADSL signal.

The American National Standards Institute (ANSI) Standard T1.413, the contents of which are incorporated herein by reference, specifies an ADSL standard that is widely followed in the telecommunications industry. The ADSL standard specifies a modulation technique known as Discrete Multi-Tone modulation.

4. Discrete Multi-Tone Modulation

Discrete Multi-Tone (DMT) uses a large number of subcarriers spaced close together. Each subcarrier is modulated using a type of Quadrature Amplitude Modulation (QAM). Alternative types of modulation include Multiple Phase Shift Keying (MPSK), including BPSK and QPSK, and Differential Phase Shift Keying (DPSK). The data bits are mapped to a series of symbols in the I-Q complex plane, and each symbol is used to modulate the amplitude and phase of one of the multiple tones, or carriers. The symbols are used to specify the magnitude and phase of a subcarrier, where each subcarrier frequency corresponds to the center frequency of the "bin" associated with a Discrete Fourier Transform (DFT). The modulated time-domain signal corresponding to all of the subcarriers can then be generated in parallel by the use of well-known DFT algorithm called Inverse Fast Fourier Transforms (IFFT).

The symbol period is relatively long compared to single carrier systems because the bandwidth available to each carrier is restricted. However, a large number of symbols is transmitted simultaneously, one on each subcarrier. The number of discrete signal points that may be distinguished on a single carrier is a function of the noise level. Thus, the signal set, or constellation, of each subcarrier is determined based on the noise level within the relevant subcarrier frequency band.

Because the symbol time is relatively long and is followed by a guard band, intersymbol interference is a less severe problem than with single carrier, high symbol rate systems. Furthermore, because each carrier has a narrow bandwidth, the channel impulse response is relatively flat across each subcarrier frequency band. The DMT standard for ADSL, ANSI T1.413, specifies 256 subcarriers, each with a 4 kHz bandwidth. Each sub-carrier can be independently modulated from zero to a maximum of 15 bits/sec/Hz. This allows up to 60 kbps per tone. DMT transmission allows modulation and coding techniques to be employed independently for each of the sub-channels.

The sub-channels overlap spectrally, but as a consequence of the orthogonality of the transform, if the distortion in the channel is mild relative to the bandwidth of a sub-channel, the data in each sub-channel can be demodulated with a small amount of interference from the other sub-channels. For high-speed wide-band applications, it is common to use a cyclic-prefix at the beginning, or a periodic extension appended at the end of each symbol to maintain orthogonality. Because of the periodic nature of the FFT, no discontinuity in the time-domain channel is generated between the symbol and the extension. It has been shown that if the channel impulse response is shorter than the length of the periodic extension, sub-channel isolation is achieved.

5. Residential Phone Wiring

Plain Ordinary Telephone Service (POTS) operates over numerous types of existing wiring layouts. Typically, the topology is a star configuration, combined with daisy chained connections for some phones. The type of wiring is also random—twisted pair, untwisted, various gauges, various numbers of wires (with possible cross-talk)—which creates a wide variation in the channel characteristics. Furthermore, the topology changes from time to time as phones are connected, disconnected, etc.

Thus the channel characteristics are very noisy and distorted, including phase distortion (group delay) and severe reflections (echoes from signals bouncing off unterminated wiring segments) and spectral dips due to unterminated wiring stubs. In addition, signals associated with the analog phone service include 48 vdc, and 100 volt ring signals. Ring signals are not zero-crossing switched, so high-frequency noise is produced. Any system operating over existing telephone wiring must contend with this environment.

SUMMARY OF THE INVENTION

There exists a need for a communication system that operates reliably over standard telephone wiring found in residential environments, thereby eliminating the need for re-wiring a residence. Furthermore, the system must operate in conjunction with existing phone service.

A gateway modem server device for a home LAN is provided. The modem server includes a first transceiver that utilizes DMT modulation methods for communication over the local LAN, and a second transceiver for communication with the access infrastructure that utilizes POTS telephone services. The LAN devices connected to the LAN access the modem server via LAN adapter devices. The adapter devices are internal or external to the LAN devices and provide a transceiver and protocol stacks for the LAN devices to communicate with each other. The physical layer of the transceivers includes transmitter having a DMT modulator and demodulator that is dynamically configurable with respect to data rate and spectrum usage.

The gateway modem server resides on the local area network and provides POTS modem service to devices on the local area network. The devices communicate with the modem server and the modem server communicates to the POTS service provider over the same medium. The gateway modem server include a POTS modem transceiver for sending and receiving modulated signals to and from the POTS service provider, and a multi-point transceiver for transmitting and receiving multi-carrier data bursts to and from a plurality of devices. The multi-point transceiver exchanges digital data with the POTS modem transceiver so that any one of the computing devices on the local area network may transmit data to the pubic network by way of the multi-point transceiver and the POTS modem transceiver.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 1:
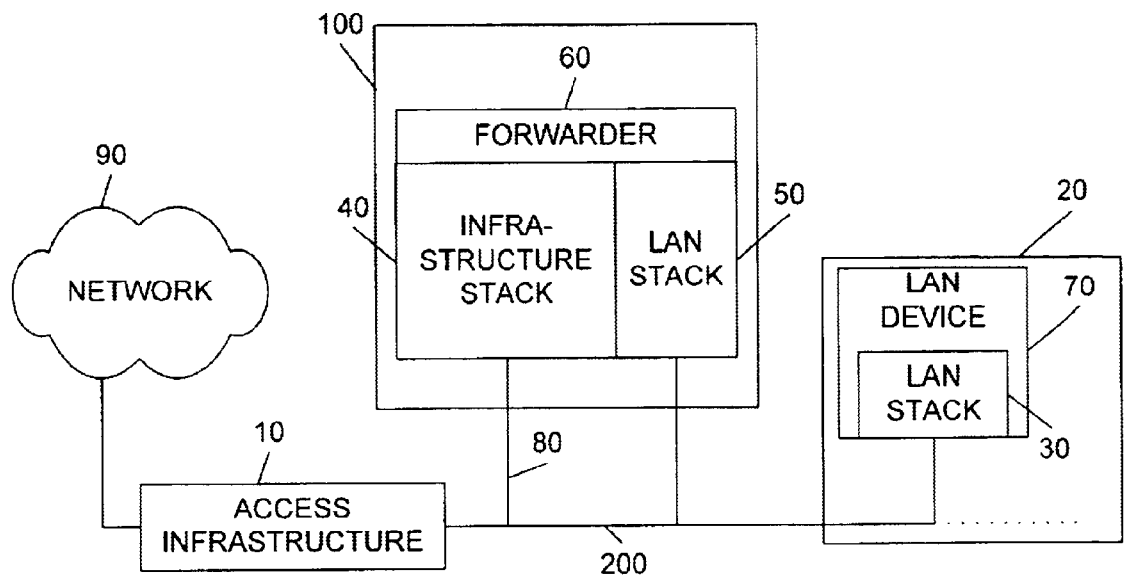
FIG. 1 depicts a preferred embodiment of the communication system.

The system described herein, depicted in FIG. 1, consists of two major components: the DMT LAN 20 and the DMT LAN gateway 100 that is connected between the DMT LAN 20 and the access infrastructure 10. The access infrastructure 10 includes the voice and data carrier networks as well as connections to the access points. The physical connection 80 to infrastructure 10 may be a standard land-line connection over twisted pair cable or may be a wireless service to the gateway 100. The gateway 100 includes an infrastructure protocol stack 40 that communicates via physical connection 80 to the access infrastructure 10 and to the network 90. The gateway 100 also includes a DMT LAN protocol stack 50 that communicates with the DMT LAN 20, and a forwarder 60 that bridges the top layers of these two stacks.

Figure 5:
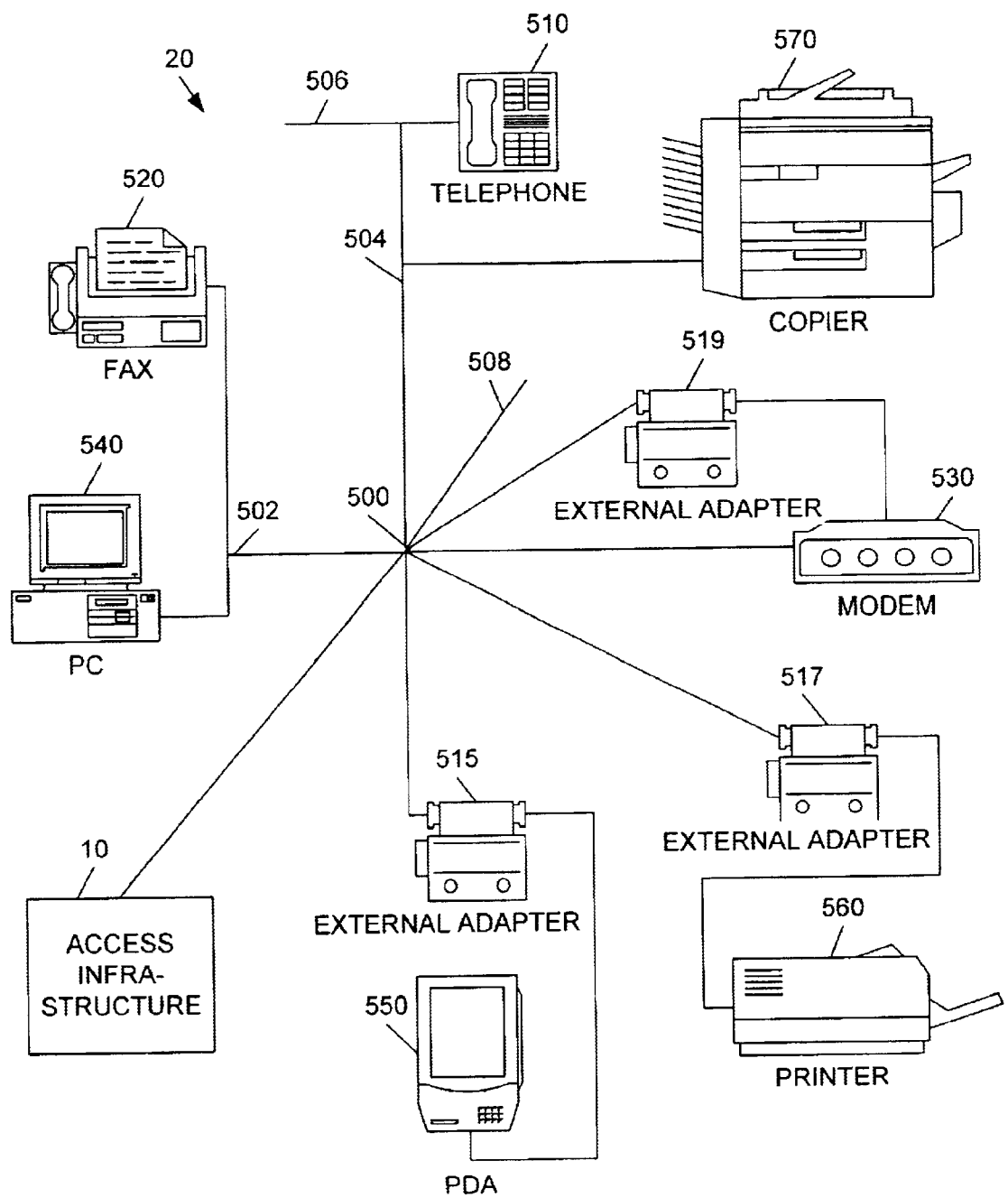
FIG. 5 shows the DMT LAN.

The DMT LAN 20 includes a plurality of devices similar to DMT LAN device 70 depicted in FIG. 1. The DMT LAN device 70 may also be referred to herein as a client device, or a node. As shown in FIG. 5, the DMT LAN devices connected to the DMT LAN 20 may include computers, computer peripherals such as printers and modems, copiers, fax machines and personal digital assistants. Also suitable for connection are TVs, audio-visual equipment, security systems, as well as less intelligent devices such as appliances, thermostats, and lighting fixtures. Less intelligent devices may have a simplified transceiver, or may be connected to the DMT LAN 20 via a separate control device or bridge. The DMT LAN medium, or physical electrical connection between devices, is preferably standard residential telephone wiring—typically pairs of twisted wires.

Figure 2:
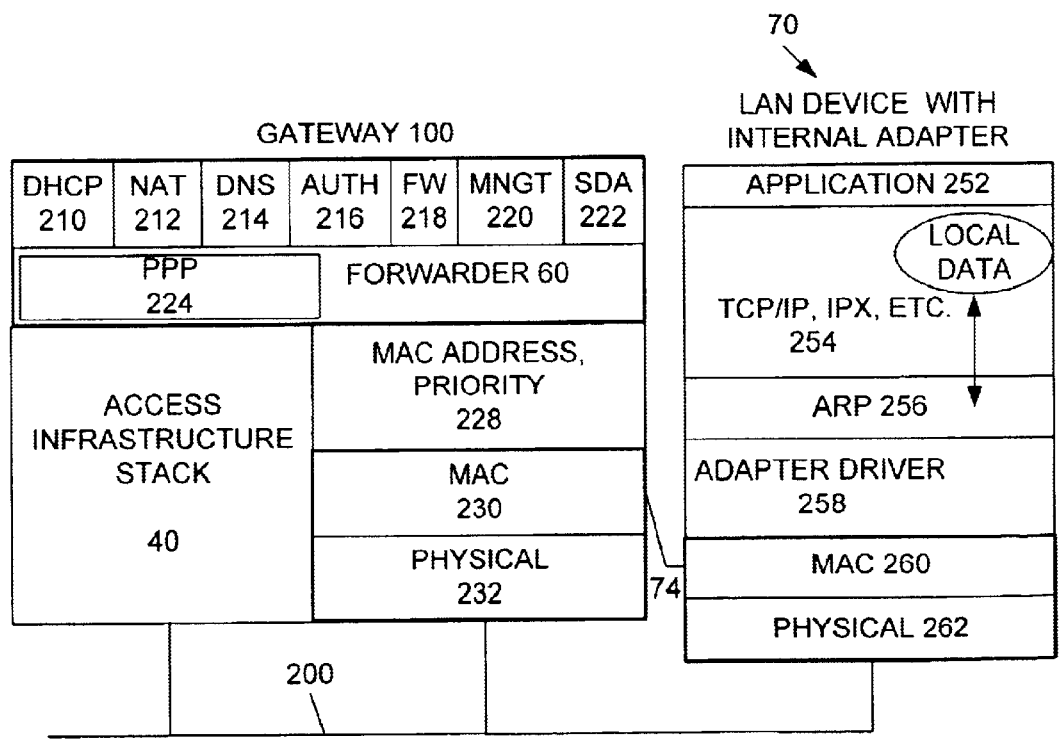
FIG. 2 shows a preferred embodiment of the protocol stacks within the gateway and the DMT LAN devices.

The preferred embodiment of the gateway 100, including forwarder 60, is shown in FIG. 2. It includes a DMT LAN adapter 74 having a transceiver 400 within the physical layer 262, and a second transceiver to implement the physical layer of access infrastructure stack 40 for communication with the access infrastructure 10. The second transceiver utilizes one of a number of communication protocols, such as those generally referred to as xDSL (e.g., ADSL, HDSL, etc.), simplified DSL known as DSL Lite or G.Lite, ISDN, cable modems, and the like.

Figure 3:
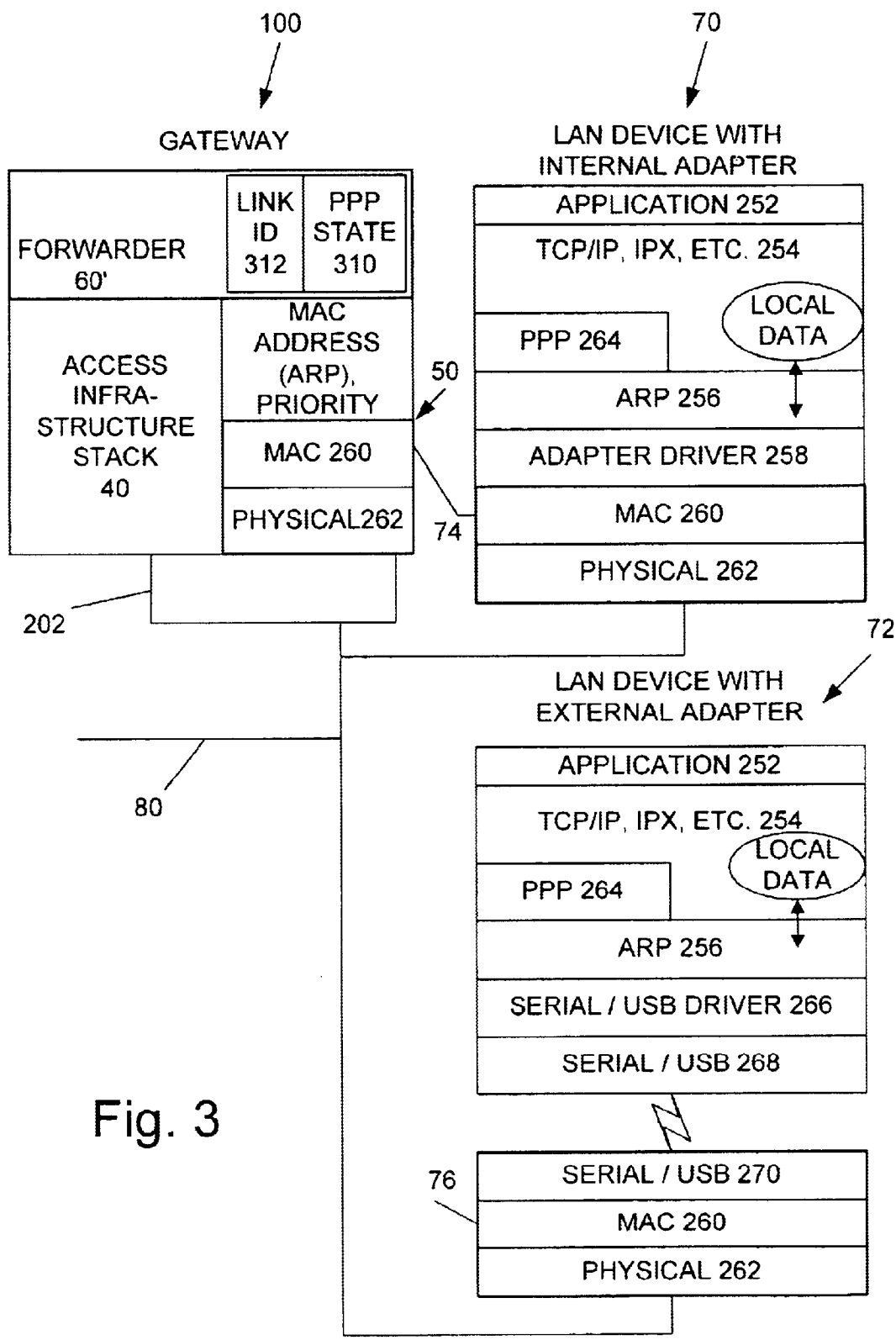
FIG. 3 shows a preferred embodiment of the simplified protocol stacks within the gateway device.

Importantly, connection 200 (as shown in FIGS. 1 and 2) may only be included under certain circumstances, depending on the type of link from gateway 100 to access infrastructure 10. Many services such as ADSL require a point to point link and require relatively high line quality. In such a case, no other devices may be directly connected over the same medium. Link 200 must therefore be omitted to keep LAN devices 70 isolated from the access infrastructure link. Other transmission technologies, however, are more flexible and will operate over a physical medium having numerous wiring segments, some of which may be unterminated. In embodiments where link 200 is appropriate, both stacks 40 and 50 of gateway 100 may be connected to the shared medium over a single electrical connection, as opposed to the two separate connections as actually depicted in FIGS. 1 and 2. Such a connection is shown for illustrative purposes in FIG. 3 with the understanding that the gateway device 100 depicted in FIGS. 1, 2, or 3 may be connected in either fashion when appropriate. In FIG. 3, link 202 connects LAM stack 50 and infrastructure stack 40 internal to the gateway device 100, which is in turn connected to the shared LAN medium, while the access infrastructure is also connected directly to the shared LAN medium. As discussed below, when link 200 (or its equivalent) is present, the operating frequency range of devices 70 on LAN 20 must be adapted so as not to interfere with communication between the gateway 100 and the access infrastructure 10.

The forwarder 60 is a multi-point forwarder that runs a single-PPP-session module 224 to provide the necessary routing functionality for multi-point connectivity between devices 70 in the DMT LAN 20 and the external WAN environment 90.

The multi-point forwarder 60 includes a name address translation protocol module 212 that allows a single PPP session (i.e., a single Internet IP address) to serve multiple DMT LAN devices 70, each having separate IP addresses on the local DMT LAN 20.

FIG. 2 shows the protocol layers and the multi-point forwarder 60 that supports multiple IP sessions on behalf of the DMT LAN devices 70 with just one PPP session terminated in module 224 of the forwarder 60. Any client device 70 may initiate the session, and it remains active until terminated. Termination may either be manual or automatic (timed). The PPP session module supports external network access for the local DMT LAN devices 70. A Network Address Translation (NAT) module 212 runs NAT services in an upper layer of the multi-point forwarder 60 thereby allowing a port number to be associated with the client's local IP address. NAT module 212 makes devices on the DMT LAN 20 appear as a single IP address, thus allowing the devices to communicate with external networks 90, including, for example, the Internet. Internally, the DMT LAN 20 uses private addressing. When a device 70, which is known locally by its private address, desires to communicate with a device on network 90, it sends the request to gateway 100. Before gateway 100 transmits the request to the network 90, forwarder 60 translates the private address to a common IP address assigned to gateway 100. Further details of NAT are disclosed in U.S. patent application Ser. No. 9/035,600, filed Mar. 5, 1998, entitled Method and Protocol for Distributed Network Address Translation, the contents of which are hereby incorporated herein by reference. All remote access is therefore handled via the multi-point forwarder's 60 PPP module 224.

The multi-point forwarder 60 includes a routing module 210 utilizing dynamic host configuration protocol (DHCP) and management module 220 (MNGT), which implements management functionality via, e.g., an SNMP agent, and a PPP module 224 for PPP session management. A PPP session can be initiated by any local device's 70 request for remote access (e.g., a Web browser). The multi-point forwarder 60 also provides session authentication and security 216 (AUTH). The routing module 210 enables local IP addresses to be assigned to any local client device 70. Network address translator 212 allows the single PPP session to provide remote connectivity to any number of client devices 70 simultaneously.

Additional services in the multi-point forwarder 60 include a domain name server 214 (DNS), firewall 218 (FW), and a simple client agent 222 (SCA). The SCA service allows simple clients, which do not have full TCP/IP capabilities, to send and receive IP data. The SCA 222 does the additional protocol processing on behalf of the simple client.

The multi-point forwarder 60 communicates with client devices 70 by way of network adapters 74. The adapters 74 include MAC resolution layer 260 and physical layer 262, which is a multi-carrier transceiver that operates in half-duplex mode. That is, one adapter 74 at a time transmits data to other adapters 74 on the DMT LAN 20. Other devices 70 then take turns transmitting via adapters 74 as determined by the MAC protocol layer 260 as described herein. Adapter devices 74 preferably support both high-speed devices or Full-Rate Device (FRD), and low-speed devices or Sub-Rate Devices (SRD) on the single DMT LAN medium.

As shown in FIG. 2, the adapter device 74 also provides the bottom layers of the protocol stack for communication on the DMT LAN-side of the gateway 100. The top layers of the stack typically run on a computing device, rather than the internal (or external) DMT LAN adapter, and ultimately terminate in applications running on a computer, or on a slow-speed SRD client. Existing host computers may require a minimal high-level configuration modification (e.g., via a standard operating system configuration tool) in order to bypass local PPP management because this functionality preferably resides in the gateway's 100 multi-point forwarder 60.

The MAC layer 260 and the physical layer 262 are implemented in all adapter devices. Data delivered down to the MAC layer are tagged with source and destination MAC addresses and priority. Data arriving to the physical layer 262 from the medium are passed to the MAC layer 260 for processing. All devices decode the destination address of incoming data and discard frames that do not correspond to their own MAC address. Any client device 70 connected to the DMT LAN network (via an adapter) can communicate with any other similarly connected device 70, or with the gateway 100.

The internal adapter 74 shown in FIGS. 2 and 3, provides the MAC layer 260 and physical layer 262 preferably in an application specific integrated circuit, or ASIC. The adapter may alternatively be configured to provide higher level protocol processing, but the LAN device 70 preferably provides the layers above the MAC layer 260. In addition, an address resolution protocol (ARP) module 256 is layered above the MAC layer 260. This allows the device 70 to query for the MAC address of any other device 70, given that device's (local) IP address. The ARP module 256 also includes a method for querying for the MAC address of the gateway 100.

If multiple devices 70 simultaneously attempt to communicate over DMT LAN medium 110, data collisions will occur. One suitable method of resolving media access contention in a multi-carrier network medium is set forth in patent application Ser. No. 09/003,844, entitled "Method And Protocol For A Medium Access Control Layer For Local Area Networks With Multiple-Priority Traffic" filed Jan. 7, 1998, the contents of which are incorporated herein by reference.

As shown in FIG. 3, the adapter device may be either an internal adapter device 74 or an external adapter device 76. Internal devices 74 are preferred primarily due to speed advantages of its interface, e.g., a standard parallel bus and. external adapter devices 76 are used primarily to provide backward compatibility. They differ mainly in that the external adapter 76 requires additional hardware (a port, or interface) and software layers (port driver 270) for communication between the adapter 76 and the client device 70 over a data bus. The internal bus may be a PCI, ISA EISA, or equivalent bus, while the external bus may be e.g., RS-232, parallel port, or USB port as shown in FIG. 3. These buses are known in the art and have been widely used by general-purpose computers. The external device adapter also provides the MAC 260 and physical layer 262 in an ASIC.

All data, whether between a remote server (via PPP) and a local client device 70 or strictly between local client devices 70, are passed between nodes on the DMT LAN network as local data. Preferably, the data are transferred using TCP/IP protocols where the addresses are assigned locally. The gateway 100 has a local IP address so that DMT LAN devices 70 can access it for forwarding data to the public network 90. The gateway 100 also has a public IP address for communication with the public network 90, where the communication is typically performed on behalf of a DMT LAN device 70.

In an alternative preferred embodiment depicted in FIG. 3, the forwarder 60' provides simplified single-point connectivity per PPP session. That is, only one PPP session is permitted at any given time, even if multiple PPP-capable clients are connected to the DMT LAN 20. The simplified forwarder 60' performs MAC address resolution when passing data to the DMT LAN 20 and acts as a data relay when passing data from the DMT LAN 20 to the access infrastructure 10. Client PPP sessions are terminated in the device 70 (e.g., personal computer) running the client that initiates the session. The simplified forwarder 60' acts primarily as a data relay between the DMT LAN protocol stack 50 and the access infrastructure protocol stack 40.

The simplified forwarder 60' differentiates only high- or low-speed traffic. The simplified forwarder 60' preferably maintains at most three MAC addresses at any given time: its own, the current high-speed PPP session owner, which is a Full-Rate Device (FRD), and the current active slow-speed device, which is a Sub-Rate Device (SRD). Only a single PPP session may be active at any given time, and the session owner (e.g., a personal computer) initiates and manages the session. The forwarder 60' is notified when the session begins and ends, and maintains the MAC address of the session owner for the duration in Link ID buffer 212. Inbound data (i.e., from the access infrastructure) from the high-speed channel is forwarded to the MAC address of the current PPP session owner stored in Link ID 212, and the MAC priority is set to high. Outbound PPP data, identified by the source MAC address, is associated with the high-speed channel. Slow speed data is processed in a similar manner, but with a low MAC priority.

In the simplified forwarder 60', protocol processing for a PPP session on a high-speed device, such as a home PC, requires that the device be configured to run and manage PPP. Only one PPP-capable client can run a PPP session at any given time. On session startup, the forwarder 60' is notified that a PPP session has become active, and is supplied with the MAC address of the PPP client on the DMT LAN network. With a PPP session active as indicated in PPP state monitor 210, no new (additional) PPP sessions may be initiated. When the session is ended, the forwarder is notified, and sets a local PPP state monitor 210 to inactive. This allows a new PPP session to be started.

The multi-point protocol stack of the client device 70 described above is compatible with the simplified forwarder 60'. Thus, the client adapters can work with either type of forwarder—simplified or multi-point. Because the client device 70 manages the PPP connection when used with the simplified forwarder 60', portions of the multi-point protocol stack are unused. The outbound PPP frames are passed directly to the adapter device driver, in a manner similar to a dialup adapter device (e.g., modem). The frame is tagged with the MAC address of the forwarder device, then handed to the MAC layer. The MAC layer hands the data to the physical layer once contention is resolved. Inbound data are passed up the stack in the reverse direction. Data recognized as a PPP frame are passed to the PPP session layer.

In the outbound direction, local data are handled the same way as in the multi-point implementation—they simply bypass the PPP layer 264, as shown in FIG. 3. The destination MAC address used is that of any local device 70 (except the gateway device 100). Inbound data are passed up the stack in the reverse direction. All adapters 74, 76 decode the destination address of incoming data, discarding frames that do not correspond to their MAC address.

The simplified forwarder 60' also distinguishes between two types of incoming data (from the access infrastructure): high-speed and low-speed. Incoming high-speed data are forwarded to the DMT LAN network with a destination derived from the MAC address of the current PPP session owner; the data are flagged as high priority, which ensures more bandwidth allocation on the DMT LAN network 20. Incoming low-speed data are forwarded to the currently active low-speed SRD device in a similar manner; these data are flagged as low priority. Outbound data (to the access infrastructure 10) are similarly directed to the high- and low-bandwidth channels according to the MAC address of the source DMT LAN device 70. The applications running on client devices 70 are responsible for setting the appropriate priority for data sent to the forwarder 60'.

The table below summarizes and compares the features and capabilities of the simplified forwarder 60' and multi-point forwarder 60.

| SIMPLIFIED FORWARDER | MULTI-POINT FORWARDER |
|---|---|
| One PPP session per connection, managed in PC | One PPP session for entire DMT LAN network managed in the gateway |
| Requires one IP session per session, per FRD device | Multiple local IP addresses supported by single gateway PPP session |
| Only one PPP session at a given time | |
| Any computer on the DMT LAN can start a PPP session, but only one at a time | Multiple simultaneous IP sessions possible |
| Full local DMT LAN support (file and printer sharing) | Any number of computers can start an IP session at any time |
| Minimal protocol processing in the RU | Full local DMT LAN support (file and printer sharing) Gateway becomes a router with NAT |

Gateway 100 may be configured initially with a simplified forwarder 60', and upgraded to multi-point forwarder 60 by a software download of the multi-point forwarder 60 to the gateway 100. Upon upgrading, local devices 70 must be configured to turn off local PPP management. Preferably, local device configuration is controlled with a software switch in the forwarder 60, 60'. Thus, no user intervention is required at all to affect the migration from a simplified forwarder 60' to a multi-point forwarder 60.

Figure 4:
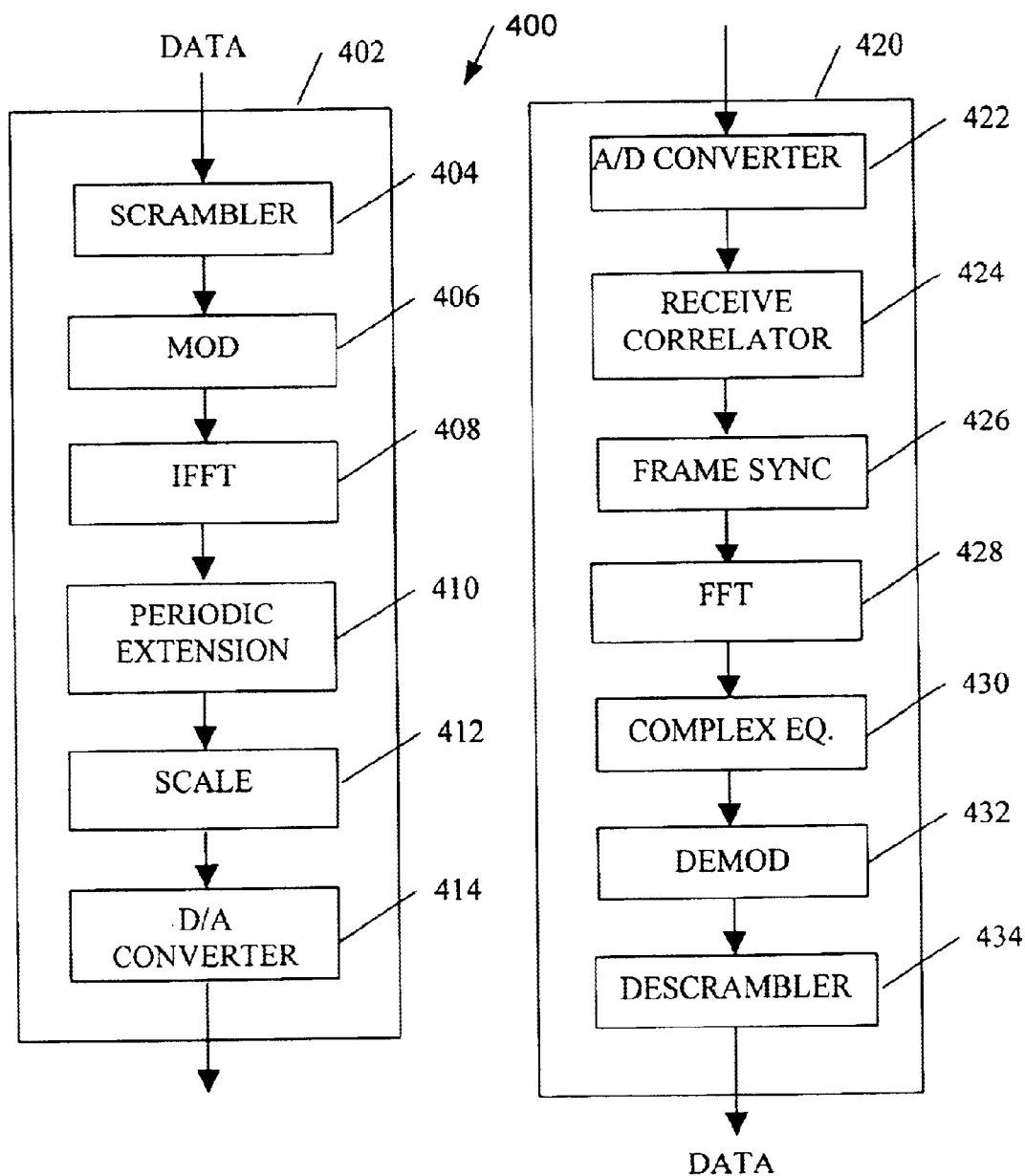
FIG. 4 is a block diagram of a preferred embodiment of the transceiver.

Gateway 100 is therefore able to interconnect numerous devices residing on a local area network 20 to a public network 90. As shown in FIG. 4, the gateway 100 includes a transceiver 400 for connection to the local LAN via a first interface, where the transceiver includes a transmitter 402 and receiver 420 for transmitting and receiving data on a number of predetermined frequency ranges over the local LAN 20 to and from any one of the devices 70. The gateway 100 also includes a second transceiver (not shown) for connection to the public network 90 via a second interface and for transmitting and receiving data to and from the public network. Depending upon the type of connection to the access infrastructure, the first and second interfaces may share a physical connection to the shared medium. The second transceiver implements the physical layer of the access infrastructure stack 40, and is also connected via stack 40, and forwarder 60/60' to the first transceiver 400 for exchanging data with the first transceiver 400, thereby connecting any one of the devices 70 on the local shared LAN 20 to the public network 90.

FIG. 5 depicts numerous devices connected to DMT LAN 20. The access infrastructure 10 is also connected directly to the DMT LAN via physical connection 80 without the use of a gateway device except for modem server 530. Of course, the DMT LAN of FIG. 5 may be connected to access infrastructure 10 using a gateway device 100 as shown in FIG. 1. When a gateway device 100 is not used to provide communication between DMT LAN devices 70 and access infrastructure 10, a filter or other isolation device may be included between the access infrastructure and the DMT LAN medium to prevent internal DMT LAN signals from reaching access infrastructure 10. In the implementation as shown in FIG. 5, access infrastructure 10 provides voice band POTS service, rather than a high speed xDSL, ISDN, G.Lite, etc., service. The devices 70 on DMT LAN 20 operate at a frequency range higher than the POTS devices such as telephone 510, fax machine 520 or modem 530, and as such, do not interfere with the POTS services provided by access infrastructure 10.

FIG. 5 depicts a number of representative devices connected to DMT LAN 20 over a typical wire medium found in a residence or small business. Many of the wiring runs originate at a central node 500, which also connects to wiring 80 from the access infrastructure 10. It is understood that wiring 80 from the access infrastructure may connect at any other point to the shared medium. Other wiring runs may diverge into separate runs such as at nodes 502 and 504. Other runs may not be connected to any device and result in an unterminated wire pair such as nodes 506 and 508. Telephone 510 and fax machine 520 are standard POTS devices, whereas the remaining devices are connected to the DMT LAN 20 via a DMT LAN adapter device. Copier 570 has an internal DMT LAN adapter, while PDA 550, printer 560 and modem 530 use external DMT LAN adapters 515, 517, 519, respectively. PC 540 may have an internal (or external) DMT LAN adapter, a POTS modem, or both, connecting it to the local shared medium.

PC 540 may communicate with, e.g., printer 560 or copier 570 over the DMT LAN while simultaneously communicating with an external device over access infrastructure 10 using an internal POTS modem (not shown).

Similarly, POTS modem 530 together with adapter 519 act as a gateway modem server that is accessible to any DMT LAN device via DMT LAN adapter 519 such that modem 530 can provide POTS modem service to any device on DMT LAN 20. Modem 530 may be configured with an internal LAN adapter, in which case a shared electrical connection may be used for both the adapter 519 and the modem 530. Multiple devices such as PCs may access DMT LAN adapter 519 using the higher frequency DMT modulation format described herein, while modem 530 simultaneously retransmits the data via voice frequency, i.e., POTS frequency, modem techniques (e.g., as specified in ITU Recommendation V.34 or V.90) to a remote user connected to network 90 via the access infrastructure 10. Modem 530 may be configured to provide a plurality of simultaneous dial-up POTS connections by connecting to the access infrastructure 10 over additional physical connections, i. e., a second POTS line.

The gateway modem server 530 thus resides on the local area network and provides POTS modem service to the devices 70 on the local area network. The devices 70 communicate with the modem server 530 and modem server 530 communicates to access infrastructure 10, i.e., the POTS service provider, over the same medium. The modem server 530 includes a POTS modem transceiver for sending and receiving modulated signals to and from the POTS service provider using the POTS frequency band. Modem server 530 also includes a multi-point transceiver 400 connected to the POTS modem transceiver in order to transmit and receive multi-carrier data bursts to and from devices 70. In this manner, any one of devices 70 on the LAN 20 may transmit to the public network 90 by way of the multi-point transceiver 400 and the POTS modem transceiver.

The adapter devices 74, 76 include a transceiver 400 that implements the physical layer 262, for communicating with other adapter devices 74, 76 and/or the multi-point transceiver 400 of the gateway device 100. As shown in FIG. 4, transceiver 400 of the preferred embodiment includes a transmitter portion 402 and a receiver portion 420. Transceiver 400 uses wide-band multi-carrier modulation, preferably in the range of 4–6 MHz. When the gateway 100 provides isolation from communications with access infrastructure (or if there are otherwise no conflicting services), the transceiver is easily scalable to operate down to approximately 100 KHz, and up to 8 MHz. It is to be understood that the frequency ranges actually used may extend beyond the presently preferred ranges given above. The adapter devices 74, 76 include an adapter interface, or port, for connection to a LAN device 70.

The preferred modulation technique used in the adapter devices 74, 76 is a Discrete Multi-Tone (DMT) multi-carrier method, where each channel is split into a number of sub-channels, each with its own carrier. Additionally, it should be understood that the transceiver may utilize a plurality of predetermined carrier frequencies and selectively transmit on less than all of the predetermined carrier frequencies. Preferably the number of carriers is sixty-four, but the transceiver is easily scalable to use an additional one hundred twenty eight, or more, carriers. The data bits are mapped to frames of complex frequency domain symbols and transformed digitally using a frequency-domain to time-domain transformation on each frame. A discrete Fourier transform (DGT) provides a computationally efficient implementation of such a transformation.

Alternatively, one of many well-known wavelet transformations may be used to generate a modulated time-domain signal. In such a case, the information symbols are modulated onto a family of wavelets where each wavelet occupies a different frequency range. Typically, each wavelet is a time-scaled version of the other wavelets in the family such that the wavelets are orthogonal. Typically, the wavelets also occupy different bandwidths, with, e.g., the longer wavelets occupying the smaller bandwidths at the lower frequency bands, and the shorter wavelets occupying larger bandwidths at the higher frequencies. In this sense, the wavelet transformer also results in a multi-carrier signal similar to a DMT signal, with each wavelet acting as a separate "carrier".

The transmitter 402 of the DMT LAN adapter transceiver 400 includes a scrambler 404 that ensures continuous data transitions. In the MOD modulator 406, the data is mapped to signal points chosen from a constellation of complex signal points. The IFFT transformer 408 performs an inverse Fourier transform on the complex points to generate a time-domain sequence. The periodic extension is appended in the periodic extension block 410 to the signal to allow for channel impulse response and to enable receiver symbol timing recovery and clock tracking. Finally, the scaler 412 adjusts the amplitude of the digital signal according to the range of the D/A converter 414, and the data is sent through the channel(s) to the receiver(s) 420. The scaler 412 may be incorporated into the IFFT module 408.

The scrambler 404 de-correlates the data such that the energy of the time-domain transmit signal is spread evenly across the spectrum. This also ensures a proper peak-to-average signal. A suitable scrambler algorithm is that used in the V.series modems, specifically ITU Recommendation V.34. The performance and complexity of this algorithm are well known, and code exists for its implementation on common DSP platforms. Alternatively, a block based scrambler using a lookup table may be used.

The MOD modulator block 406 maps input data to complex points in a signal constellation for each sub-channel. One of a number of modulation techniques may be used. Quadrature Amplitude Modulation (QAM), Multiple Phase Shift Keying (MPSK) (including QPSK), Differential Phase Shift Keying (DPSK) (including DQPSK) and the. like, are all possible modulation schemes. DQPSK is presently preferred. The phase of each carrier is compared to its previous phase from symbol to symbol. This has the advantage of resolving phase ambiguities between the transmitter and receiver.

Figure 6:
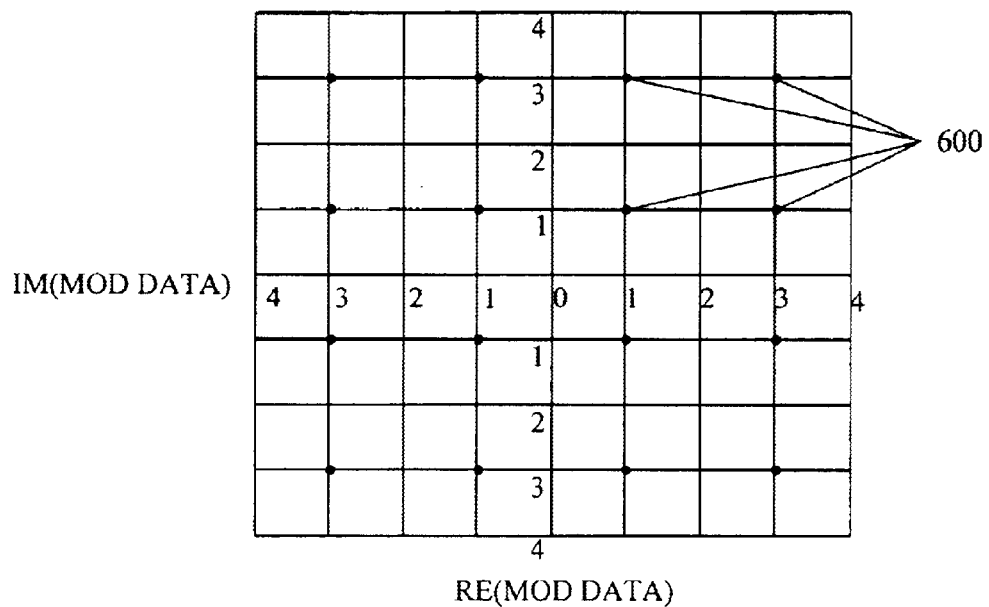
FIG. 6 shows a representative modulation signal point constellation.

For illustrative purpose, a typical QAM constellation consisting of sixteen points is shown in FIG. 6. The points represent the magnitude of a sine and cosine signal component of the modulated carrier. Alternatively, the points may be considered as the magnitude and phase of a given modulated carrier. Integer-valued signal points are merely a convenience, and result in efficient processing in the modulator as well as in the receive demodulator and decision feedback equalizer loop.

The constellation in FIG. 6 is representative of a QAM constellation having four points (labeled in FIG. 6 as points 600) per quadrant. In practice, the size is generally determined by the signal-to-noise ratio encountered on the channel in a standard rate-negotiation period. Thus, a given carrier may have a smaller or larger constellation, depending on the noise present in that band. The scaling of the function is arranged such that each constellation point results in a real and imaginary part, both being integers. The modulator 406 may include a trellis decoder and other Forward Error Correcting (FEC) coders as are well known in the art.

In the presently preferred embodiment, modulator 406 is a 64 tone DMT modulator utilizing the bandwidth between approximately 4–6 MHz. Preferably, the sample rate is 16 MHz, and in accordance with the well-known Nyquist sampling theorem, this implies that the total possible usable bandwidth is the range from 0–8 MHz. However, in the preferred embodiment, only a portion of the total capacity is used. This is accomplished in the following manner: a 512 point inverse DFT is used, resulting in a total capacity of 256 carriers across the 8 MHz bandwidth, but only the 64 carriers between 4–6 MHz are modulated while the remaining carriers are set to zero.

To generate a real-valued time-domain signal using an inverse DFT, a 512 point Inverse Fast Fourier Transform (IFFT) is performed, where the last 256 points are reverse-ordered complex conjugates of the first 256 points. It is a well-known property of discrete Fourier transforms that real-valued time domain signals have conjugate-symmetric Fourier transforms. In the preferred embodiment, the bin numbers of approximately 128 to 191 (and bins 321 to 384 being the reverse order complex conjugates) are used, with the remainder of bins set to zero. Thus, the real-valued time domain signal will have 512 values.

Voice-band frequency content is eliminated in the modulated signal because the frequency bins corresponding to the voice-band are set to zero. The modulated DMT signal does therefore not interfere with POTS devices that are operating over the same wiring. Similarly, the frequency bins corresponding to any other data services present on the LAN medium are set to zero. In this manner, the gateway device 100, adapter devices 74, 76, and the access infrastructure may all be connected to the shared medium, while allowing communication among DMT LAN devices without interfering with data services over link 80. If no such data services are present, or if the gateway device is connected as discussed above such that the LAN 20 is isolated from access infrastructure 10, then the lower frequency bins may be used.

The formula for the IFFT inverse transform is:

$$d_j = \frac{1}{\sqrt{n}} \sum_{k=1}^{n-1} w_k e^{-2\pi i \left(\frac{j}{n}\right)k},$$

for $0 \leq j < 128$, where the $d_j$ are the time domain data points, n is the length of the IFFT, $w_k$ are the complex-valued symbols, and $i = \sqrt{-1}$. The $w_k$ are set to a zero value for bins corresponding to frequencies that are not used. This is the case for at least the first, or DC, bin so as to prevent interference with the operation of POTS devices connected to the DMT LAN 20. Hence, the above summation begins at k=1 because $w_0$ is preferably always zero. If the DMT LAN does not operate over the same medium as POTS devices, the DC bin may be used. Setting the appropriate $w_k$ to zero may easily zero out other frequency ranges in use by other devices.

The periodic extension is appended in block 410. The periodic extension, or cyclic extension as it is often referred to, is a repetition of the beginning samples of the time-domain signal generated by the DFT and is appended to the time-domain signal. One of ordinary skill will recognize that a periodic or cyclic prefix is an equivalent to the periodic extension. The length of the periodic extension is preferably at least as long as the channel impulse response. The model of the channel impulse response includes echoes from unterminated wiring segments within the DMT LAN, which are typical in a home DMT LAN because it is operating over existing twisted pair telephone wiring. The length of the periodic extension is computed based on the worst-case channel impulse response time, the worst case expected reflected echo tails, and the expected symbol (frame) timing error encountered at the receiver. The symbol timing recovery accuracy is mostly a function of the complexity of the receive correlator. Thus the number of periodic extension samples E is based on twice the worst-case channel impulse response as follows:

$$E = \frac{2 \cdot D}{1/F_s}$$

where D is the worst case maximum group delay in seconds, and $F_s$ is the sampling rate (in seconds) of the A/D (and D/A) converter. For illustrative purposes, with an $F_s$ of 1 MHz, and 40 μsec as the expected channel impulse response time as a result of group delay, an 80 sample extension is required. The calculation for the length of the periodic extension is a one-time calculation. The periodic extension simply appends the required number of samples to the time domain data.

Figure 7:
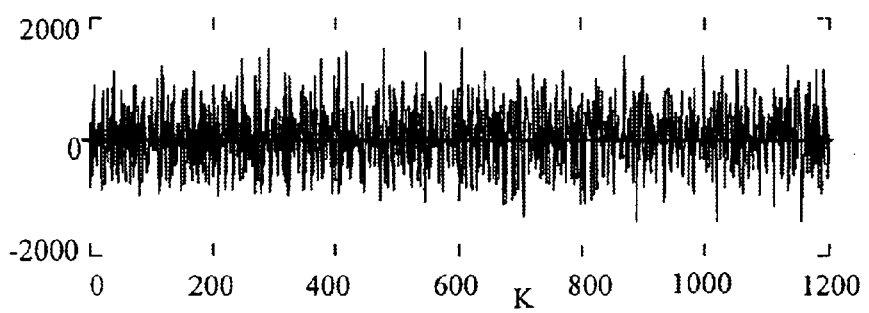
FIG. 7 depicts transmit data.

Once the time-domain transmit signal is generated for the current frame of data, it is scaled by the scaler 412 such that it fills as closely as possible the available bits of the D/A converter 414. Thus the scaling must be by a constant value. To do otherwise would result in an amplitude envelope from frame to frame that would produce undesirable effects. The time domain data to be transmitted is shown in FIG. 7, depicting approximately ten frames of data.

The receiver 420 is shown in FIG. 4. The receiver 420 must first obtain frame synchronization. It performs this task by processing the received samples from A/D converter 422 in a correlator 424. The Frame Synchronizer 426 re-arranges the samples such that the leading-edge samples in each frame are replaced by samples from the periodic extension. Alternatively, a cyclic prefix may be used, where the end of the data sequence is copied and pre-pended to the transmit sequence. An FFT transformer 428 performs a transform of the real valued time domain signal and generates a complex frequency domain signal. The first frame contains known data and is used to determine the equalizer coefficients in the equalizer 430. Equalizer 430 processes subsequent blocks of received data using these coefficients and updates the coefficients based on an error signal.

Figure 8:
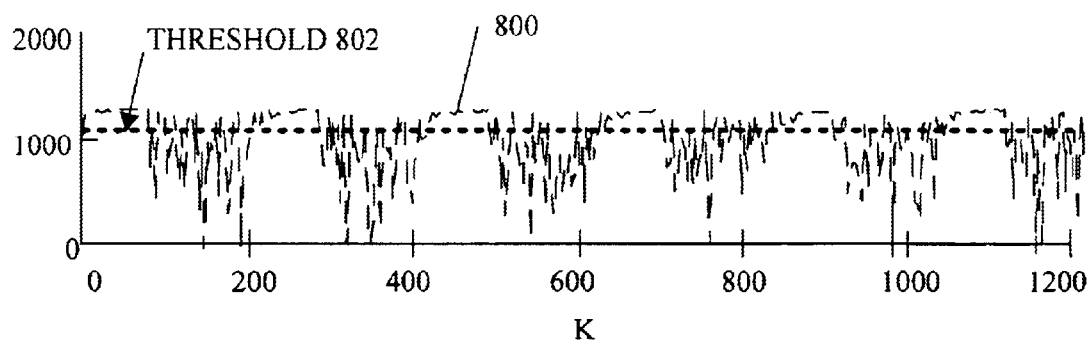
FIG. 8 shows a correlation signal at the receive correlator.

The frame synchronizer 426 and the correlator 424 accomplish symbol timing. The receive time-domain samples are passed to the correlator 424. The correlator 424 performs a sliding correlation of the samples spaced the length of the time-domain FFT period, which, in the preferred case, is one hundred twenty eight samples. The correlator 424 then provides a correlation output 800 as shown in FIG. 8. The length of the periodic extension was intentionally generated as a very long time (80 samples) so it is easy to visualize the correlation function in FIG. 8. In practice the extension depends upon the physical medium as described herein, but typically is shorter than 80 samples. Alternatively, a method using pilot tones may be used. In such a scheme the phases of two adjacent pilot tones transmitted in the first frame are compared to determine the frame index. Because a sampling offset results in a progressive phase offset from bin to bin of a DFT, an examination of the extent of the phase offset between two known symbols will yield the sampling offset, and thus the frame index.

The frame synchronizer 426 examines the correlator output 800 and searches it for a high correlation output that is at least half the length of the periodic extension. The process is adaptive, starting with some threshold 802, then adjusting down until it finds the correlation. Analysis of the correlation output may be facilitated by the application of a filter such as a moving average filter, or other low-pass filter. The synchronizer 426 provides the index into the data buffer containing the first sample of the first frame of receive time-domain data, and also provides the threshold at which the correlation was found for the purposes of algorithm validation.

FFT transformer 428 operates on the synchronized time-domain data to generate the frequency domain spectrum. The Fourier transform used within block 428 takes the real time-domain receive samples that have been properly framed and produces an output consisting of complex values containing real and imaginary components. The function used is equivalent to:

$$w_j = \frac{1}{\sqrt{n}} \sum_{k=1}^{n-1} d_k e^{2\pi i \left(\frac{k}{n}\right) j},$$

for $0 \leq j < 64$, where the $d_k$ are the time domain data points, n is the length of the FFT, $w_j$ are the complex-valued symbols, and $i = \sqrt{-1}$.

The transformed frequency domain data represents the magnitude and phase of the carriers. The FFT points are commonly referred to as "frequency bins." The length of the output will contain half as many points as the real valued time-domain receive signal because only the first 64 points are calculated. As stated previously, the other frequency domain points are merely complex conjugates of the desired points, and are therefore not needed.

The data is then equalized in block 430 and demodulated in block 432. The equalizer 430 is a frequency domain complex equalizer that simultaneously solves the problems of symbol timing error, clock error and drift, channel phase and attenuation distortion, and removes any number of echoes caused by reflections of unterminated wiring segments. This is accomplished in one mathematical step of low complexity.

Figure 9:
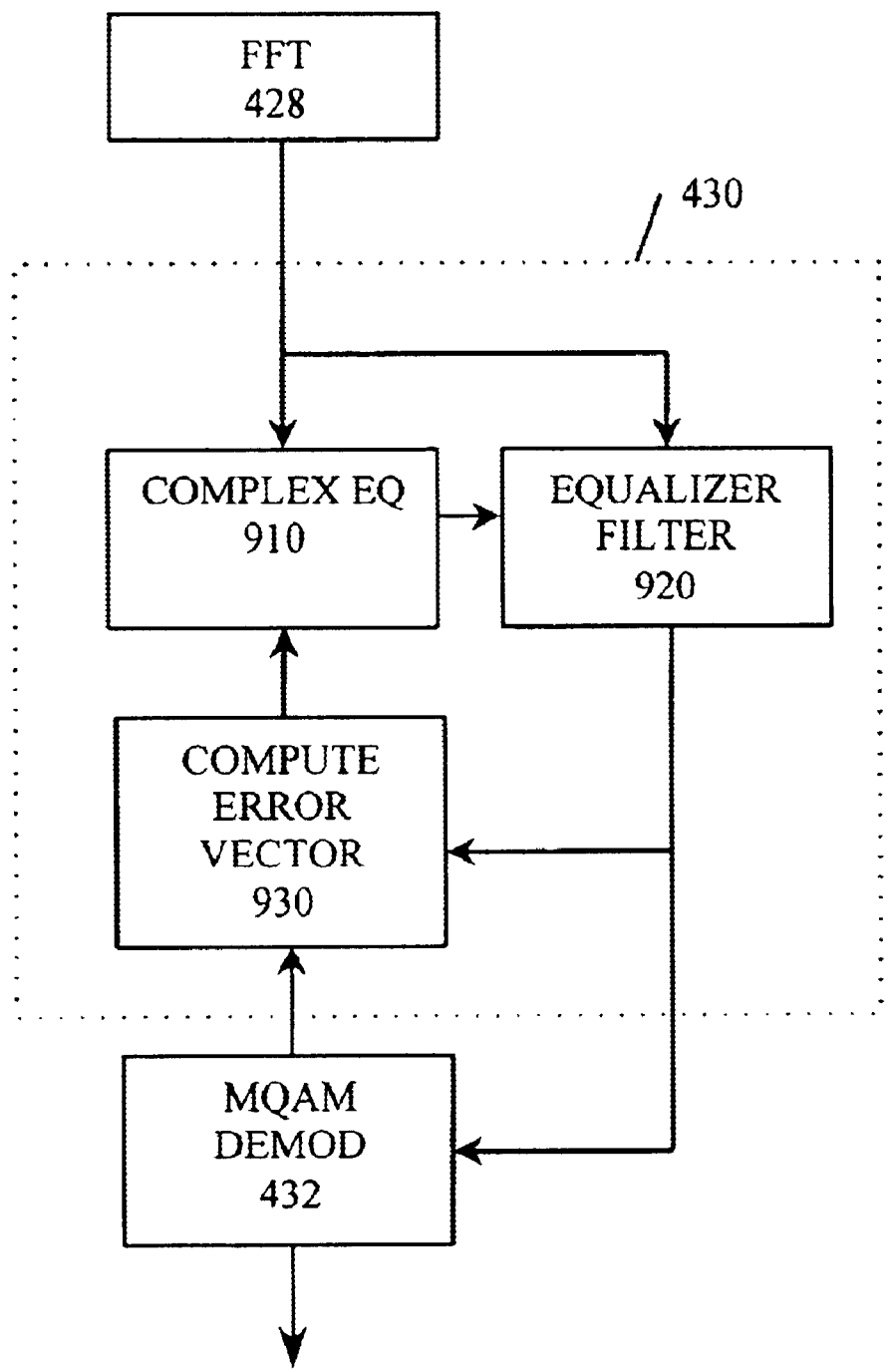
FIG. 9 shows the equalizer.

A block diagram of the equalizer 430 is shown in FIG. 9. In the preferred embodiment, the transmitted data is arranged in packets, with each packet consisting of concatenated frames transmitted in serial fashion. The first frame of a packet is an equalization frame of known symbols that is used to provide a coarse estimate of the channel. The receiver's equalizer 430 is trained to the channel using this frame by forming the ratio of the expected symbol to the received symbol for each frequency bin within the frame. The ratios for each tap of equalizer filter 920 are formed using the complex-valued frequency domain values that are readily available from the FFT block 428. The result is a sequence of points (e.g., a vector) where each point corresponds to a frequency bin, and each value is an estimate of the inverse of the channel response at that frequency.

Multiplication of the frequency domain representation of the incoming frames by the equalizer taps results in a circular de-convolution of the channel impulse response. The circular de-convolution is made possible by the periodic extension, which makes the receive data to appear as if it had been circularly convolved by the channel impulse response. Thus the single step of multiplying the transformed data frames by the equalizer coefficients prior to demodulation corrects for channel impulse response distortion, sampling offset, clock/timing error, etc.

In the preferred embodiment of transceiver 400, the use of only a single frame for the initial training of the equalizer 430 results in a lower signal to noise ratio than if the equalizer 430 is trained over a longer sequence of symbols.

While this reduces the number of available constellation points (given a desired bit error rate), and hence reduces the data rate, the overall reduction of complexity in transceiver 400 is highly advantageous. For example, because the equalizer 430 is trained very quickly on a single frame of known symbols, the equalizer 430 need not retain channel information corresponding to a particular transmitter 402 of device 70 on LAN 20. This is desirable, especially when numerous devices 70 are transmitting on the DMT LAN 20. Without the rapid equalization scheme described herein, the equalizer 430 would typically either have to store large amounts of equalization data for each of the other transmitting devices 70 on the DMT LAN and retrain every device when the LAN characteristics change, or it would have to perform a lengthy retraining procedure each time a DMT LAN transmitter 402 initiated a session. To retrain the equalizers for every device would require much additional protocol functionality to implement the retraining procedure. Such a scheme would also create undesirable transmission delays on LAN 20.

An alternative frequency domain equalization scheme is also provided. In the alternative embodiment, known equalization symbols are inserted into the data stream such that every $N^{th}$ bin contains a known symbol. The known symbols are referred to herein as equalization symbols, and the bins are referred to as equalization bins. Preferably, every eighth bin is an equalization bin, and is used in every data frame. The frequency response of the channel at frequencies corresponding to the remaining bins is then estimated by interpolating between the received equalization symbols in the equalization bins. The equalization symbols may vary from equalization bin to equalization bin, but preferably the same set of predetermined estimation symbols is sent in every data frame. A running average for each equalization bin is calculated upon the receipt of a new frame once frame has been transformed to the frequency domain. The equalizer taps are updated using the averaged points corresponding to the equalization bins in addition to the points interpolated there-between. Standard interpolation techniques may be used to obtain the entire channel estimate from the running average of the equalization bins.

A decision feedback loop is used after the QAM demodulator to generate an error vector in DFE block 930 that is used to update the equalizer taps after each frame is processed. The DFE block 930 allows the equalizer to track slow changes in the channel and to track clock error between the transmitter and receiver. The DFE structure is not used, however, in the second preferred equalizer that utilizes the interpolative techniques discussed above.

The demodulator block 432 takes the complex frequency domain points for each bin after equalization, then demodulates those points back to real data. Demodulator 432 includes data slicers to determine the nearest constellation point to the received (and equalized) point. The demodulator may include a trellis decoder and other FEC decoders. The descrambler 434 reverses the scrambling of the data as described in the transmitter section based on the V.34 scrambler, or a block-based lookup table. Of course, DFE block 830 may update the taps based upon the decoded data decisions instead of the slicer outputs because the data decisions may be more accurate due to FEC processing.

A preferred embodiment of the present invention has been described herein. It is to be understood, of course, that changes and modifications may be made in the embodiment without departing from the true scope of the present invention, as defined by the appended claims.

I claim:

1. A gateway modem server residing on a discrete multi-tone local area network and providing POTS modem service to a plurality of devices on the discrete multi-tone local area network, where the devices communicate with the gateway modem server and the gateway modem server communicates to a POTS service provider over the discrete multi-tone local area network, said gateway modem server comprising:
    a POTS modem transceiver for sending and receiving modulated signals to and from a the POTS service provider, said modulated signals primarily occupying the POTS frequency band;
    a multi-point transceiver connected to said POTS modem transceiver, wherein said multi-point transceiver transmits and receives multi-carrier data bursts to and from the plurality of devices on the discrete multi-tone local area network, and wherein said multi-point transceiver exchanges digital data with said POTS modem transceiver;
    whereby any one of the plurality of devices on the discrete multi-tone local area network transmits to a public network by way of said multi-point transceiver and said POTS modem transceiver.

2. The gateway modem server of claim 1 wherein said multi-point transceiver utilizes a plurality of predetermined carrier frequencies and selectively transmit on less than all of said plurality of predetermined carrier frequencies.

3. The gateway modem server of claim 1 wherein said multi-point transceiver includes a transformer for converting frequency domain signals to time domain signals.

4. The gateway modem server of claim 3 wherein said transformer performs a discrete Fourier transform.

5. The gateway modem server of claim 1, wherein the medium over which said multi-point transceiver transmits and receives multi-carrier data bursts is POTS wiring.

6. The gateway modem server of claim 1 wherein said data bursts comprise a plurality of frames wherein at least one frame contains at least one predetermined data symbol.

7. The gateway modem server of claim 1, wherein said transceiver further comprises a frequency domain equalizer.

8. The gateway modem server of claim 7, wherein said transceiver transmits at least one known symbol on at least two non-adjacent carriers and transmits data symbols on carriers between said at least two non-adjacent carriers, and wherein said frequency domain equalizer generates filter taps for each said carrier in response to said at least one known symbol on at least two non-adjacent carriers.

9. The gateway modem server of claim 8, wherein said equalizer generates said filter taps by interpolating points between the received said at least one known symbol on at least two non-adjacent carriers.

10. The gateway modem server of claim 9, wherein said equalizer updates said filter taps by calculating averages of said at least one known symbol for each of said at least two carriers and interpolating points between said averages.

11. The gateway modem server of claim 1, wherein said transceiver transmits known symbols on every $N^{th}$ carrier, where N is any integer greater than 1.

12. The gateway modem server of claim 1, wherein said multi-point transceiver further comprises a point-to-point protocol module that provides routing functionality for multi-point connectivity between the plurality of devices on the local area network and the public network.

13. The gateway modem server of claim 1, wherein said multi-point transceiver further comprises a network address translation (NAT) module.

14. The gateway modem server of claim 1, wherein said multi-point transceiver further comprises a dynamic host configuration protocol (DICP) module.

15. The gateway modem server of claim 1, wherein said multi-point transceiver further comprises a management module having a single network management protocol (SNMP) agent and a point-to-point protocol module.

16. The gateway modem server of claim 1, wherein said multi-point transceiver further comprises a simple client agent.

17. The gateway modem server of claim 1, wherein said multi-point transceiver further comprises a network adapter that communicates with full-rate devices (FRD) and sub-rate devices (SRD).

18. The gateway modem server of claim 17, wherein said network adapter further comprises an address resolution protocol (ARP) module for querying a MAC address from at least one of the plurality of devices on the local area network.

19. The gateway modem server of claim 1, wherein said multi-point transceiver is adapted for communication using one of ISDN, G.Lite and xDSL services.

20. The gateway modem server of claim 1, wherein said multi-point transceiver further comprises at least one of a routing module and a session authentication and security module.

* * * * *